US009417323B2

(12) United States Patent
Carande et al.

(10) Patent No.: US 9,417,323 B2
(45) Date of Patent: Aug. 16, 2016

(54) SAR POINT CLOUD GENERATION SYSTEM

(71) Applicant: Neva Ridge Technologies, Boulder, CO (US)

(72) Inventors: Richard E. Carande, Boulder, CO (US); David Cohen, Boulder, CO (US)

(73) Assignee: Neva Ridge Technologies, Boulder, CO (US)

( * ) Notice: Subject to any disclaimer, the term of this patent is extended or adjusted under 35 U.S.C. 154(b) by 370 days.

(21) Appl. No.: 14/073,664

(22) Filed: Nov. 6, 2013

(65) Prior Publication Data

US 2015/0042510 A1 Feb. 12, 2015

Related U.S. Application Data

(60) Provisional application No. 61/723,693, filed on Nov. 7, 2012.

(51) Int. Cl.
*G01S 13/90* (2006.01)

(52) U.S. Cl.
CPC ............ *G01S 13/9023* (2013.01); *G01S 13/90* (2013.01); *G01S 13/9035* (2013.01)

(58) Field of Classification Search
CPC ...................................... G01S 13/90–13/9094
USPC ....... 342/25 R, 25 A, 25 B, 25 C, 25 D, 25 E, 342/25 F
See application file for complete search history.

(56) References Cited

U.S. PATENT DOCUMENTS

| 5,394,151 A * | 2/1995 | Knaell ................ G01S 7/4021 342/25 F |
| 5,677,693 A | 10/1997 | Frankot et al. |
| 6,424,287 B1 * | 7/2002 | Doerry ................ G01S 13/9023 342/25 R |
| 6,864,828 B1 * | 3/2005 | Golubiewski ....... G01S 13/9023 342/147 |
| 7,046,841 B1 | 5/2006 | Dow et al. |
| 7,710,561 B2 | 5/2010 | Roth |
| 8,275,547 B2 | 9/2012 | Rousselle et al. |
| 8,344,934 B2 * | 1/2013 | Ryland ............... G01S 13/9035 342/179 |
| 2011/0163912 A1 * | 7/2011 | Ranney .................. G01S 13/90 342/25 F |
| 2011/0175770 A1 * | 7/2011 | Boufounos .......... G06K 9/0063 342/25 A |
| 2012/0206293 A1 * | 8/2012 | Nguyen .................. G01S 7/414 342/25 F |

(Continued)

OTHER PUBLICATIONS

Forest Lee-Elkin; Lee Potter, An algorithm for wide aperture 3D SAR imaging with measured data, Algorithms for Synthetic Aperture Radar Imagery XVIII, 80510A, (May 5, 2011).*

(Continued)

*Primary Examiner* — Peter Bythrow
(74) *Attorney, Agent, or Firm* — Macheledt Bales LLP; Jennifer L. Bales

(57) ABSTRACT

The SAR Point Cloud Generation System processes synthetic aperture radar (SAR) data acquired from multiple spatially separated SAR apertures in such a manner as to be able to calculate accurate three-dimensional positions of all of the scatterers within the imaged scene. No spatial averaging is applied thus preserving the high resolution of the original SAR data, and no phase unwrapping processes are required. The effects of height ambiguities are significantly reduced in the SAR Point Cloud Generation System. The SAR Point Cloud Generation System also self-filters against mixed-height pixels that can lead to incorrect height estimates. The system estimates scatterer height by a maximization of an Interferometric Response Function.

25 Claims, 11 Drawing Sheets

(56) References Cited

U.S. PATENT DOCUMENTS

2012/0319892 A1* 12/2012 Calabrese ........... G01S 13/9023
 342/25 C
2014/0091965 A1* 4/2014 Sheen ..................... G01S 13/90
 342/25 A

OTHER PUBLICATIONS

Christian D. Austin; Emre Ertin; Randolph L. Moses, Sparse multipass 3D SAR imaging: applications to the GOTCHA data set, Proc. SPIE 7337, Algorithms for Synthetic Aperture Radar Imagery XVI, 733703 (Apr. 29, 2009).*

PCT Third Party Observation, Anonymous, Mar. 8, 2015.

Ambiguity resolution in SAR interferometry by use of three phase centers, Charles V. Jakowatz, Jr., et al., CONF-9604105—/SAN095-2118C.

Interferometric Synthetic Aperture Radar Terrain Elevation Mapping from Multiple Observations, Dennis C. Ghiglia et al., 0-7803-1948-8/94 1994 IEEE.

Syntketic Interferometer Radar for Topographic Mapping, Leroy c. Graham, Proceedings of the IEEE, vol. 62, No. 6, Jun. 1974.

* cited by examiner

ACTUAL HEIGHT     FIGURE 3

SINGLE-PASS, K=4

SAR POINT CLOUD GENERATION SYSTEM

BACKGROUND OF THE INVENTION

1. Field of the Invention

This invention relates to the field of using remote radar systems for mapping terrain and structures found on the terrain in three dimensions.

2. Description of the Related Art

Synthetic Aperture Radar (SAR) was invented as a military reconnaissance instrument in the 1950's and further developed through the 1960's as a way to image ground terrain at high resolution, typically from an aircraft. It had advantages over passive optical reconnaissance systems since it could operate at night and see through clouds. Furthermore, due to the nature of SAR imaging techniques, the sensor could operate at very large standoff distances without sacrificing resolution. During the early 1970's interferometric SAR systems were invented. In such systems, the phase difference of the radar echoes received at two antennas spaced perpendicular to the aircraft's velocity vector are used to estimate the elevation angle from the SAR to the terrain (and thus the height of the terrain) (Richman, Graham). Using interferometric SAR (InSAR), it was possible to produce terrain maps as well as high-resolution imagery that could be displayed on the terrain map.

Throughout the 1980's and 1990's such InSAR instruments and processing techniques were developed for scientific, military and commercial applications (Goldstein et al. U.S. Pat. No. 4,551,724, Brown U.S. Pat. No. 5,170,171). Madsen et al. present an end-to-end solution for processing 2-antenna InSAR data for elevation extraction in U.S. Pat. No. 5,659,318. Encouraged by these maturing radar and processor technologies, in February 2000 the US Government flew an InSAR instrument on Space Shuttle Endeavour. During the 11-day mission, the instrument successfully mapped the terrain of over 80% of the Earth's landmass, and almost 100% of the landmass located between 60 degrees north latitude and 54 degrees south latitude.

Interferometric SAR systems require two receive antennas that view a common area of terrain from a slightly different elevation angle, where the elevation angle is the angle between the nadir vector (pointing from the SAR platform straight down to the earth's surface), and the radar line-of-site vector. The two observations may be made at the same time from different locations on the same platform, or at different times from possibly different platforms. There are various constraints on the radar hardware and InSAR geometry that are well known in the art; but of particular importance is the separation, or baseline, between the two antennas. This separation leads to the slightly differing elevation angles viewed by each antenna. The larger the separation is, the more sensitive the InSAR system is to terrain height variation. The separation therefore must be large enough to produce a measurement of radar phase differences that may be usefully converted into terrain heights, but not so large as to become incoherent making phase measurements very noisy and accurate elevation determination impossible. For these reasons, design of a two-antenna InSAR system requires a trade-off between height sensitivity and interferometric phase noise.

A related and limiting issue involves what are known as height ambiguities. Since the phase measurement of any interferometer only allows the measurement of the modulus of the total phase difference (that is, all the phase measurement are between $-\pi$ and $\pi$ radians), there are multiple heights that can yield the same measured phase. Such phase measurements are termed wrapped. However, it is the absolute phase measurement (not wrapped) that is required for determining absolute height of a pixel. Given, or assuming, a true height of some (control) point in the image, an unwrapped phase for that point may be determined Wrapped phases for the nearby points may then be unwrapped by assuming heights do not differ from the control point by an amount that would cause the phase difference to change by $+/-\pi/2$ radians (Ghiglia and Pritt) through adjacent pixels. This height is called the ambiguity height. The unwrapping process may be continued throughout the entire two-dimensional SAR scene, and will result in an accurate terrain map of the area relative to the control point height, assuming there are no height discontinuities greater than half of the ambiguity height within the scene. In the case where there are such discontinuities, InSAR elevation estimates will be in error by some multiple of the height ambiguity, and this error will propagate throughout the scene due to the unwrapping process. Some techniques for identifying ambiguity errors have been developed, but no methods for their robust repairs are possible (Ghiglia and Pritt). Current best practice is to "null" out any known problematic points, i.e. not include height measurements for those points. This produces an elevation map with nulls, or holes.

Various unwrapping approaches have been developed (e.g. Least-Squares approach as described by Ghiglia et al. in U.S. Pat. No. 5,424,743), that mitigate these discontinuity errors and eliminate nulls, but essentially have the effect of reducing the accuracy of terrain models that contain height ambiguities by spreading their deleterious effect throughout the scene.

Height ambiguities become a limiting factor for high-resolution InSAR systems. The resolution of modern SAR systems is such that having the capability to resolve human-scale objects in two dimensions is common To be useful, any three-dimensional mapping system based on such high-resolution 2D SAR data requires a commensurate height resolution. In order to obtain high precision in the measurement of height, a traditional 2-antenna system would require a large baseline. However, as described above, this necessarily introduces a small height ambiguity and this limits the amount of terrain slope that can be correctly measured over small distances, and hence the ultimate utility of the 3D imager. An approach for addressing this height ambiguity challenge was presented by Jakowatz [Jakowatz, 1996] through the simultaneous use of a small and a large baseline interferometer.

Another factor that limits the utility of the 2-pass/antenna InSAR technique involves pixels with multiple scatterers at different heights. Such an occurrence is likely when pixels are in layover, which happens frequently when imaging discontinuous terrain such as an urban landscape. Each scatterer in the pixel will contribute coherently to the SAR image pixel's response, and thus the phase of the pixel, and derived height of that pixel, will be based on the mixed phase value. The derived pixel elevation will correspond to some height between the actual heights of the scatterers, depending on the relative radar cross-section of the scatterers.

For these reasons, the generation of high-resolution and precision maps of areas containing discontinuous heights, such as built-up urban areas, is not practical with two-antenna InSAR systems.

SUMMARY OF THE INVENTION

One object of the present invention is to provide a method and technique for obtaining high-resolution and high-precision three-dimensional representations of terrain and more importantly objects on the terrain using a radio frequency imaging device on a remote, or set of remote, platforms.

Using Synthetic Aperture Radar (SAR) as an imaging modality, such a technique has been developed and is called a SAR Point Cloud (SPC) Generation System. The SAR Point Cloud Generation System is an apparatus and processing system for producing dense and accurate three-dimensional point locations (point clouds) from a series of SAR images, and is useful for generating high-precision 3D products not obtainable from traditional SAR or 2-aperture InSAR approaches.

There are several steps in obtaining such point clouds. Data must first be acquired from a suitable geometry containing K synthetic aperture centers and within suitable time constraints so as to maintain scene coherence. The acquired SAR data must be processed to K complex SAR images using a coherent SAR image formation processor. One of the complex images is selected as a reference image using a particular approach. The remaining K−1 complex images are then accurately geometrically co-registered to the reference image, taking into account differential layover effects. (These K co-registered complex SAR images are averaged incoherently across apertures to produce an averaged image for later use.) Each complex image formed from a given SAR aperture is considered a layer within a stack of images; and a given pixel (i, j) within the stack corresponds to the same physical location within the scene, with each layer representing complex backscatter obtained from a slightly different view of the given location. The complex vector associated with the set of complex pixel at (i, j) within the stack is considered a sparse aperture measurement. Single-look interferograms are formed between each of the registered images and the reference image, resulting in a new stack of K−1 complex interferometric images. Each interferogram is considered a layer in a stack of co-registered interferograms.

The phase of any complex pixel within the stack of interferograms indicates the path difference between the image location and the SAR aperture location of the reference image, and the image location and the SAR aperture location of the image for that layer in the stack (secondary image). The interferograms are phase corrected to account for phase errors due to imperfect knowledge of the aperture locations as well as other sources of phase errors (co-phasing).

The measured K−1 phase differences for a given pixel in the stack are combined based on various trials for the height of the pixel, forming a measured interferometric response function (MIRF). The maximum of the MIRF is detected. If this value is above some threshold, processing continues for this point, if not, processing ends for this point. The estimated height, h, used to obtain the maximum in the MIRF is the best estimate of the height for that pixel based on the observations. Each set of K−1 pixels within the stack of images is examined in this manner. The resulting heights of each pixel are stored in a computer file along with the (i, j) location of the pixel as a triplet, along with the MIRF value of the peak and the average SAR backscatter intensity for that pixel encoded with height in the form of a R-G-B color.

The (i, j, h) triplets represent 3D coordinates in a known SAR coordinate system that can be related to any 3D map coordinate system. The triplet is transformed based on the known SAR coordinate system and the desired output coordinate system. Also retained for this point are the MIRF peak value and the R-G-B values. The transformed data, now an augmented 3D map-projected point cloud, is stored in a computer file and available for analysis.

A particularly valuable augmentation to this process involves combining several independently derived SAR point clouds of a target as viewed from different aspect angles, or azimuths. Since many 3D structures, particularly manmade structures, have radar responses that are highly dependent on the viewing angle, a combination of geometrically diverse point clouds provides a much more detailed and complete representation of the target. These multiple aspect views may be obtained in a deliberate manner by collecting the SAR data along a circular path such that the imaged area of interest is always viewed. Repeated circles provide the sparse aperture needed for the SPC product derivation at each azimuth angle. A similar product can be generated from linear (non-circular) acquisitions also if appropriate lines are flown. This linear approach provides the ability to acquire multi-aspect SPC products from systems that cannot execute circular collections, such as a spaceborne system.

A preferred embodiment is to provide the multiple apertures of the sparse aperture for generating the phase history data used for SPC generation on a single platform for simultaneous data collection. This allows for higher quality data to be acquired since there will be no temporal changes between the observations that can limit the quality and completeness of the point clouds generated via repeat passes. All but one of the radar systems that comprise the apertures of the sparse aperture may be passive receive-only radar systems that receive the echoes from the radar signal transmitted by a single active aperture. The apertures may all be active, or some mix of active and passive apertures. The use of passive apertures can reduce the cost of the multi-aperture system. Such a system flown in a circular path as described above will provide very efficiently collected and accurate 3D point cloud data of large areas of terrain that may include complex objects.

BRIEF DESCRIPTION OF THE DRAWINGS

In order to better describe the present invention, several diagrams, figures and flow charts are provided as figures. A brief description of these figures follows.

DETAILED DESCRIPTION

Figure 1:
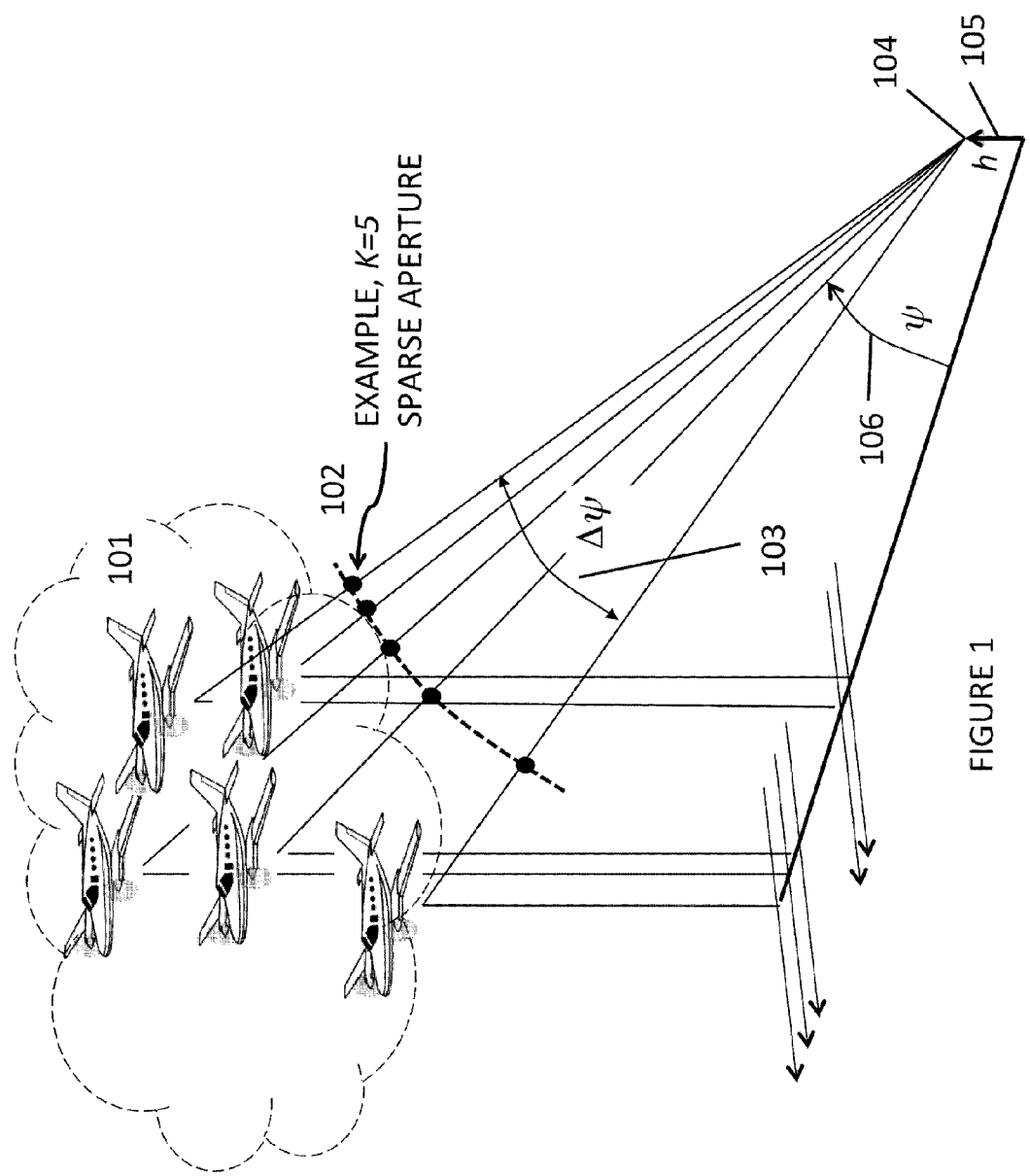
FIG. 1 is a schematic diagram showing an example data-gathering configuration for the invention. In this example 5 SAR systems on up to 5 aircraft (K=5) are used to image a common area of the ground containing targets and terrain of interest. (A single aircraft and SAR system may be used via repeated flight lines at different times.)

Referring to the drawing figures, FIG. 1 shows one version of a SAR Point Cloud collection system. Individual SAR systems flown in aircraft 101 (with suitable geometry as will be described herein) image to the side using synthetic aperture radar technology. The ensemble of SAR data acquired by the individual SAR systems, which may be acquired at the same time or at different times, form a sparse imaging aperture 102 which may be considered the input to the present invention. A geometric constraint such that the full angle 103 subtended by the sparse aperture from a point on the ground 104 elevated a distance h 105 above a reference plane, is well within a maximum angle required to maintain spatial coherence of the SAR echoes, $$\Delta \psi_{max} = \frac{\lambda}{2\rho_g} \frac{1}{\sin(\psi)},$$

where $\rho_g$ is the SAR resolution on the ground plane and $\psi$ 106 is the average graze angle of all the SAR systems to the point on the ground. While it is possible to utilize the present invention with data acquired with larger apertures than this, the resulting point cloud would then only retain truly isolated point scatterers in the result. By maintaining this maximum angle requirement, we will include points in our result that are derived from pixels containing multiple scatterers, as long as those scatterers are at similar heights.

A model is implemented corresponding to a SAR measurement at SAR locations 101 and equivalently to each element of the sparse array 102, from the target 104. The modeled unit magnitude complex phasor representing this measurement V(h) by the $k^{th}$ aperture is given by:

$$V_k(h) = \exp\{-i\beta_k h\} \quad (1)$$

where $\beta_i$ is a phase scaling factor associated with the collection geometry and system parameters. $\beta_i$, as will be shown later, is simply the familiar phase-to-height scaling factor from conventional interferometry. The modeled general complex measurement $s_k$ for the $k^{th}$ SAR antenna ($A_k$), is given by:

$$s_k = bV_k + \eta_k = be^{-i\beta_k h} + \eta_k \quad (2)$$

Here, b is the complex backscatter coefficient for the pixel of interest, which is assumed not to vary between the K measurements, $\eta_k$ is an additive noise term, which is a zero-mean complex circular Gaussian variable with variance defined as $\sigma^2$; and $\beta_k$ has been discussed above. The measurements from the K apertures may be represented by the following generalization of equation (2).

$$s = bV(h) + \eta \quad (3)$$

where V is the measurement vector that includes the phase contribution of a target's elevation as modeled by the phase-to-height proportionality factor and $\eta$ is the thermal noise vector. A goal of the current invention is to optimally infer the scatterer height, h 105, from the set of K measurements. To accomplish this, we employ a maximum likelihood estimate (MLE).

The Gaussian density function for each of the measurements represented by the model in (3) as a function of the actual measurements $s_i$ is:

$$p(s_i; b, h, \sigma^2) = \frac{1}{2\pi\sigma^2} \exp\left\{-\frac{(s_i - \langle s_i \rangle)^*(s_i - \langle s_i \rangle)}{2\sigma^2}\right\}. \quad (4)$$

We can write the multivariate distribution for the measurement vector s:

$$p(s; b, h, \sigma^2) = \frac{1}{(2\pi)^K |\Sigma|} \exp\{-(s - bV(h))^H \Sigma^{-1}(s - bV(h))\} \quad (5)$$

where $\Sigma$ is the covariance matrix and all other variables are previously defined. Note in (5) that the expectation values have been replaced by those from the model in equation (3). The problem is simplified by the fact that this covariance matrix is a scaled identity matrix (that is, it is of the form $\sigma^2 I_K$, where $I_K$ is the K×K identity matrix and $\sigma^2$ has been defined above) so that the above equation is more simply written as:

$$p(s; h, b, \sigma^2) = \frac{1}{(2\pi\sigma^2)^K} \exp\left\{-\frac{(s - bV(h))^H (s - bV(h))}{2\sigma^2}\right\}. \quad (6)$$

This is the likelihood function for the current problem. It is a function of the unknowns: b, h, and $\sigma^2$. The general approach here is to maximize the above equation with respect to each of these unknowns, with the ultimate objective of finding the value of h, for each pixel, which occurs with the maximum likelihood. As we will see in the following, the MLE of the scatterer height will not be a function of the noise variance $\sigma^2$ but will be dependent on the backscatter coefficient b. Therefore, we begin by estimating the unknown backscattering coefficient b by differentiating the above equation with respect to b and setting the result equal to zero. Since the backscattering coefficient is a complex quantity we perform this operation for the real and imaginary parts separately. For the real part, we obtain the following.

$$\frac{dp(s)}{db_r} = C\frac{d}{db_r}\exp\left\{-\frac{(s - bV(h))^H (s - bV(h))}{2\sigma^2}\right\} = 0, \quad (7)$$

where C a constant independent of the backscattering coefficient. The derivative is straightforward. The result can then be solved for the MLE of the real part of b. When a similar operation is performed for the imaginary part, the following results.

$$\hat{b}_r = \frac{s^H V + V^H s}{2K} \text{ and } \hat{b}_i = i\frac{s^H V - V^H s}{2K}, \quad (8)$$

where ^ indicates the MLE. These expressions are combined to form the full complex value as:

$$\hat{b} = \hat{b}_r + i\hat{b}_r = \frac{V^H s}{K}. \quad (9)$$

Returning to equation (6), before we substitute the MLE of b, we note that it is sufficient to maximize the log of the likelihood. In fact, it is sufficient to maximize the result of any monotone transformation, which preserves the sign of the first derivative of the original function. The log-likelihood function is given by the following.

$$\log(p(s)) = \text{const.} + \frac{(2\text{Re}(s^H b V(h)) - \|s\|^2 - |b|^2 \|V(h)\|^2}{2\sigma^2}, \quad (10)$$

where we have simply completed the multiplication in the argument of the exponential function. Here, the $\|*\|$ is the vector norm and $\text{Re}(*)$ represents the real part of the argument. Upon substitution of the MLE of the backscattering coefficient (equation (9)), we note that only the first term in the above equation is a function of scatterer height, h, and perform three additional (and simple) monotone transformations to obtain the following expression.

$$Q(h) \equiv \frac{|V^H(h)s|}{\|V\| \|s\|}. \quad (11)$$

Here, the quantity has been normalized to the range (0,1). To reiterate, the quantity Q(h) is the likelihood function for h; the value of h that maximizes Q(h) corresponds to the MLE value of the scatterer height for that pixel. The ultimate task of the 3D Point Location measurement is to accurately find that value of h.

While the development thus far is in the context of complex SAR images, it is, for a variety of reasons, both conceptual and operational, often preferable to operate in the domain of interferometric measurements. We therefore cast this quantity into a form based on a vector of interferometric measurements defined as I, by multiplying the numerator and denominator in (11) by $\sqrt{I_{pp}}$, where $I_{pk} \equiv s_p s_k^*$ is the complex interferometric value at the pixel of interest and the index p corresponds to any of the K apertures. Showing the vector multiplication explicitly gives the following restatement of the likelihood function.

$$Q(h) = \frac{[(\Sigma V_k^* s_k)(\Sigma V_k^* s_k)^*]^{\frac{1}{2}} \sqrt{I_{pp}}}{\|V\| [\Sigma (s_k)(s_k)^*]^{\frac{1}{2}} \sqrt{I_{pp}}} = \quad (12)$$

$$\frac{[(\Sigma V_k^* s_k s_p^*)(\Sigma V_k^* s_k s_p^*)^*]^{\frac{1}{2}}}{\|V\| [\Sigma (s_k s_p^*)(s_k s_p^*)^*]^{\frac{1}{2}}} = \frac{|V^H(h)I|}{\sqrt{K} \|I\|}.$$

Here, $\|V\|=K$ is an identity. Furthermore, the above result contains an implicit phase shift in the vector V such that its elements are computed relative to the interferometric reference (p). We may now restate the form of this vector along with its physical significance in the context of familiar interferometry concepts. That is, we redefine this vector as $$V_k(h) = \exp\left\{-i\left(\frac{4\pi B_\perp^{pk}}{R \lambda \cos \psi}\right)h\right\} \equiv \exp\{-i\beta_{pk}h\}, \quad (13)$$

where $\lambda$ is the radar wavelength; $B_\perp^{pn}$ is the perpendicular baseline, defined as the component of the antenna separation vector orthogonal to the look direction, between the $k^{th}$ and $p^{th}$ collections; R is the slant range; $\psi$ is the graze angle 106; and h is the elevation 105 of the scatterer of interest as shown in FIG. 1. Note that $\beta_i$ is then identically the familiar phase-to-height scaling factor from conventional InSAR. This factor describes the sensitivity of a given SAR interferometer to changes in scatterer height.

Note that the quantity in (12) is very similar to the coherence that is routinely computed in conventional interferometry. There, the quality of the InSAR phase estimates is improved by combining contiguous complex values after compensating for the height of each pixel. This is usually done using a known elevation model to compensate the phase at each pixel, given the known interferometric baseline, for the expected phase due to topography. In direct analogy with that case, the above equation represents a coherence computed across sparse element apertures (possibly time in the case of multiple data acquisitions) instead of across image space. This is consistent with a key advantage of the new approach, which is that phase estimation performed over element apertures replaces spatial averaging and enables measurements for individual full resolution pixels, not spatially averaged pixels.

Referring to equation (12), because V(h) is typically highly nonlinear with respect to h, one embodiment of a maximization process we have developed is an intelligent trial and error process where the span of possible values for h is methodically tested until the maximum result is found. We calculate a theoretical quantity corresponding to a noise-free version of that equation which is called the Interferometric Response Function (IRF) [Ghiglia, 1994] and is derived from (12) as:

$$IRF \equiv Q_0(h) = \frac{1}{K}\left|\sum_{k=1}^{K} \exp\{-i\beta_{pk}h\}\right|. \quad (14)$$

This is the theoretical MLE for a target located at a reference height, which we here assume to be zero without any loss of generalization. $Q_0(h)$ is then the normalized sum of complex sinusoids of phase offsets and periods dictated by the specific geometry of the sparse aperture, ($\beta_{pk}$), and 3D target location (h).

Figures 2A, 2B, 2C, 2D:
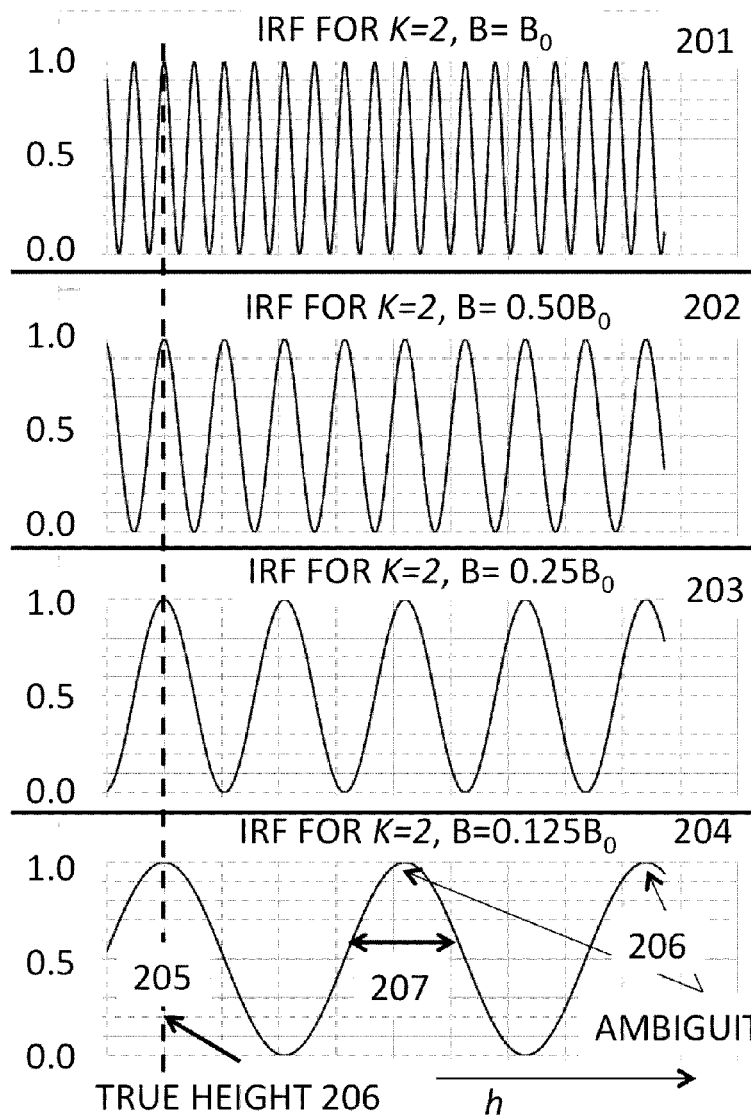
FIGS. 2A-2D are plots illustrating four examples of the Interferometric Response Function (IRF) calculated for 2 acquisitions (K=2) for various antenna separation distances. This corresponds to IRFs that are possible with traditional 2-antenna InSAR.

For the 2-element aperture (K=2) of the traditional InSAR case, FIGS. 2A-2D show four examples of the $Q_0(h)$ function. In this case only a single sinusoid will be represented by $Q_0(h)$ with its period determined by the separation of the two elements of the interferometer. As this separation is progressively increased from a value of $B_0$ 201, to $0.5B_0$ 202, to $0.25B_0$ 203, to $0.125B_0$ 204, we see the IRF period correspondingly increasing. FIGS. 2A-2D also indicate the true height 205 of the scatterer 104 at which height each of the $Q_0(h)$ functions is at a maximum. However, as noted earlier, traditional 2-antenna InSAR has height ambiguities, and these are represented in FIG. 2D as peaks in the $Q_0(h)$ function at other values of h 206. For smaller antenna separation values 204, the ambiguities are farther apart, providing a larger height range over which height estimations may be made unambiguously. Conversely, as the antenna separation increases 203, 202, 201, the height ambiguities get closer together. For larger separations, the sensitivity of the interferometer, as indicated by the width of the peak of the function maximum 207, improves. These two observations illustrate the challenge discussed earlier regarding the construction of a sensitive high-resolution 2-element InSAR system.

Figure 3A:
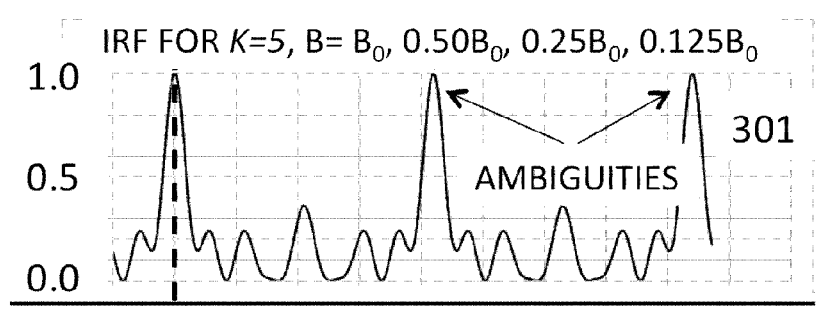
FIGS. 3A and 3B are plots illustrating the IRFs obtainable from two different K=5 configurations and illustrates the improved ambiguity performance possible.
Figure 3B:
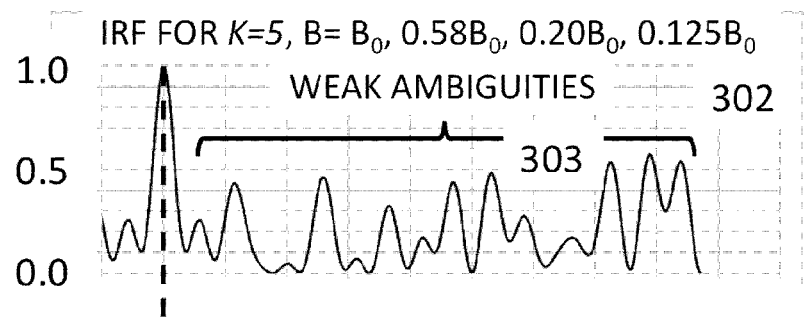

FIGS. 3A-3B present the $Q_0(h)$ function, or the IRF, for two different cases for K=5. When the antenna elements consist of a superposition of the five elements considered in FIG. 3A, an IRF 301 is produced that has the ambiguity height of the smallest element separation and the sensitivity of the largest element. If we modify the element spacing in a pseudo random manner we may further push out the ambiguities, removing all competing strength ambiguities over some range of heights, h, while retaining the sensitivity of the largest baseline 302, as shown in FIG. 3B. The weak ambiguities 303 which remain can become inconsequential with sufficient signal to noise SAR data, thus simultaneously achieving large height ambiguities and good height sensitivity.

Figure 4:
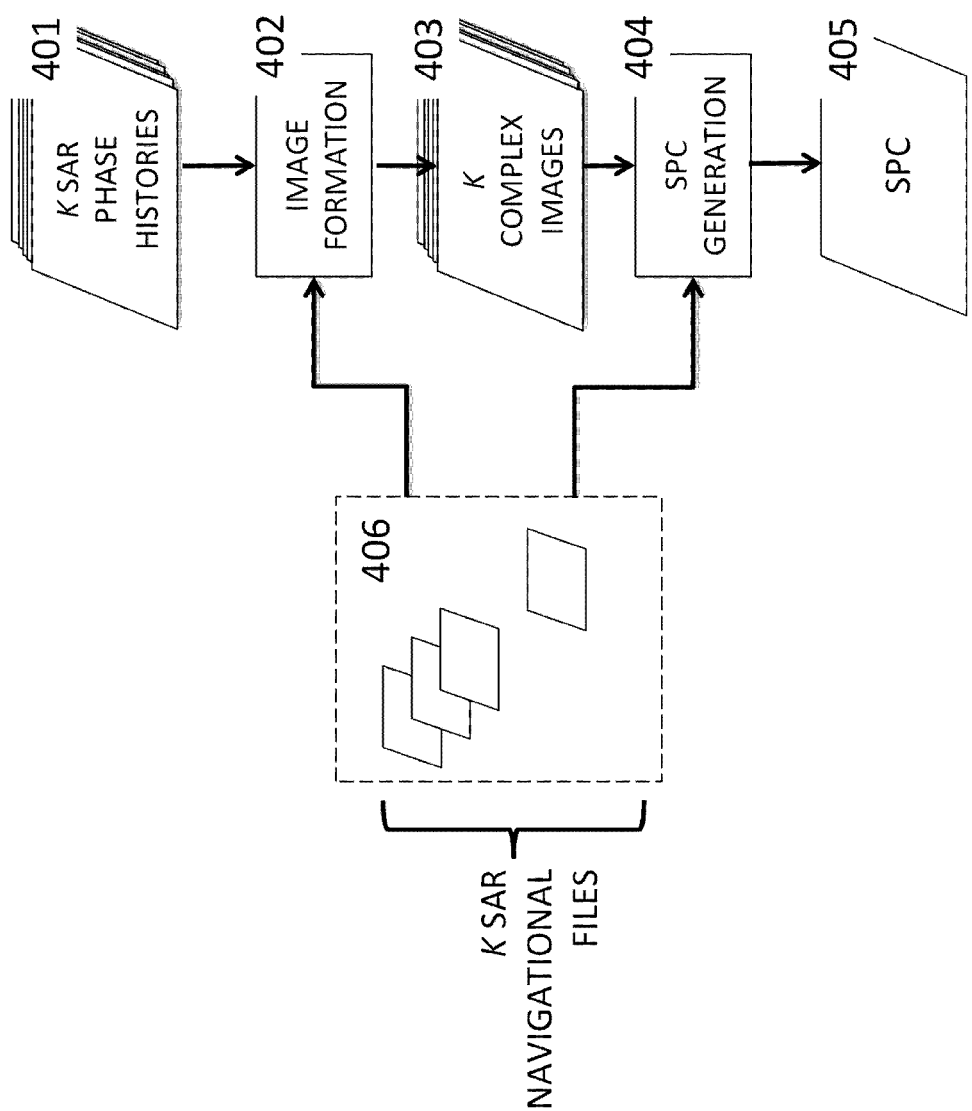
FIG. 4 is a high-level flow diagram illustrating processing steps for going from phase history data to SAR Point Cloud (SPC) data.

The present invention generally includes the main functions as shown in FIG. 4. SAR Phase history may be obtained for K elements of a sparse aperture as indicated earlier in FIG. 1. Each of the K phase histories 401 collected is converted into K corresponding complex SAR images 403. Performing such processing is well known to those familiar with the art of synthetic aperture radar. The processor may be any phase-preserving SAR image formation processor 402. The processor may be based on a Fourier algorithm such as the range-Doppler algorithm or polar format algorithm; or the processor may be based on a time-domain algorithm such as a convolution back-projection algorithm. The choice of algorithm is not critical to the present invention, however, further steps in the processing for generating the SAR Point Clouds should be aware of the complex image format including the geometric projection and coordinate system of the output image samples, which will depend on the image formation algorithm used. The K complex images 403 serve as the input to the SAR Point Cloud generator 404, which results in a single output file containing the SAR Point Cloud 405.

Figure 5:
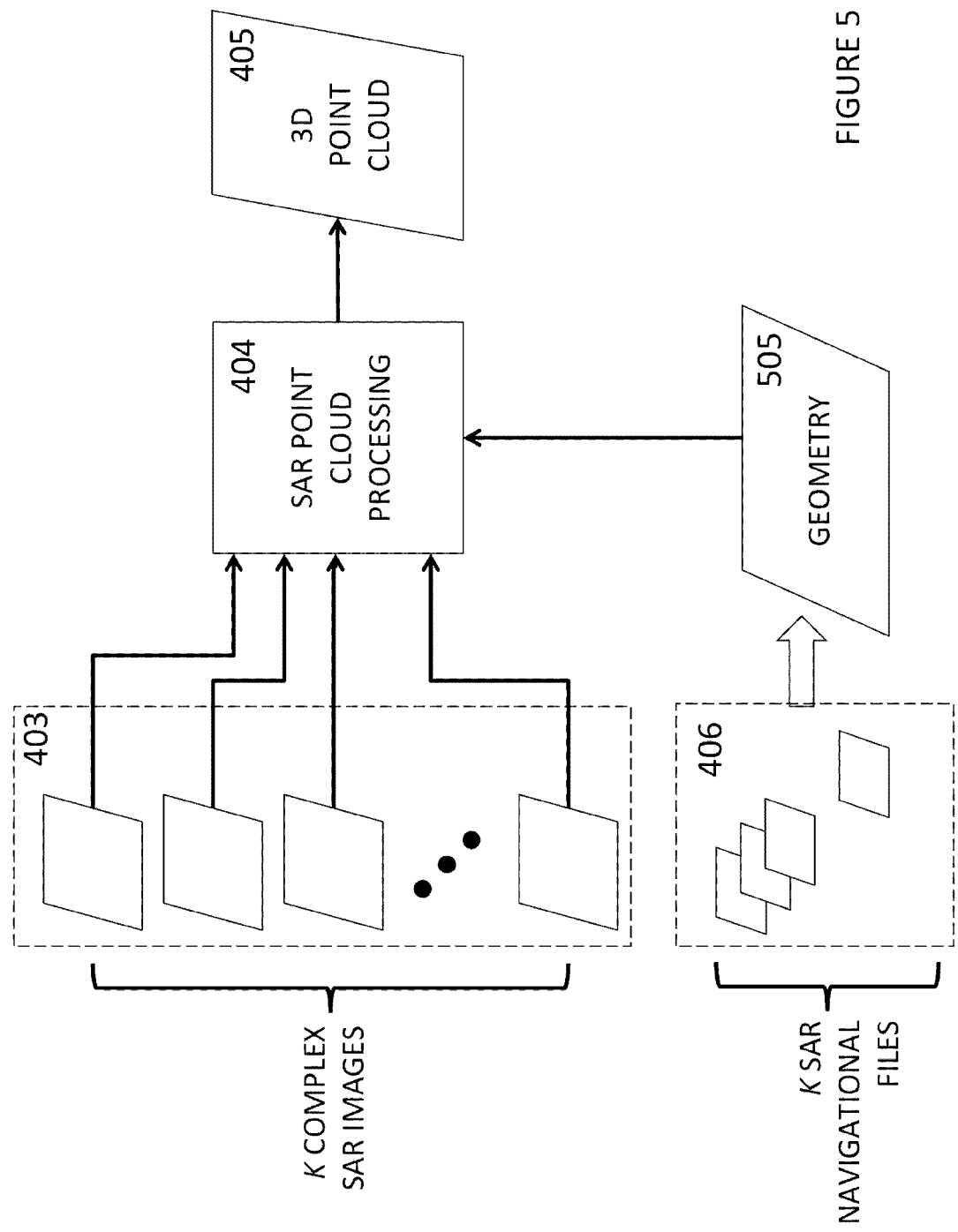
FIG. 5 is a flow diagram illustrating the SPC formation process of FIG. 4 in more detail.

The SAR Point Cloud processing is further described in more detail in FIG. 5. Here, the K complex data files 403 are also associated with ancillary data that includes navigation information 406, one file for each of the complex images. The details of the navigation files will vary from data set to data set, but should include enough information to reconstruct the 3D locations of the synthetic aperture in space, and thus the 3D locations of the elements of the sparse array 102. This includes the antenna Doppler pointing angle, as modified by the attitude of the SAR platform and other details related to the radar settings so that the 2D range-Doppler (or similar) coordinates of the $k^{th}$ SAR image can be established relative to the location of the SAR platform during the $k^{th}$ acquisition. This data is processed 505 to standard geometric parameters for consumption by the SAR Point Cloud processing system 404 which uses this information along with the complex imagery to produce a geometrically positioned 3D SAR Point Cloud 405.

Figure 6:
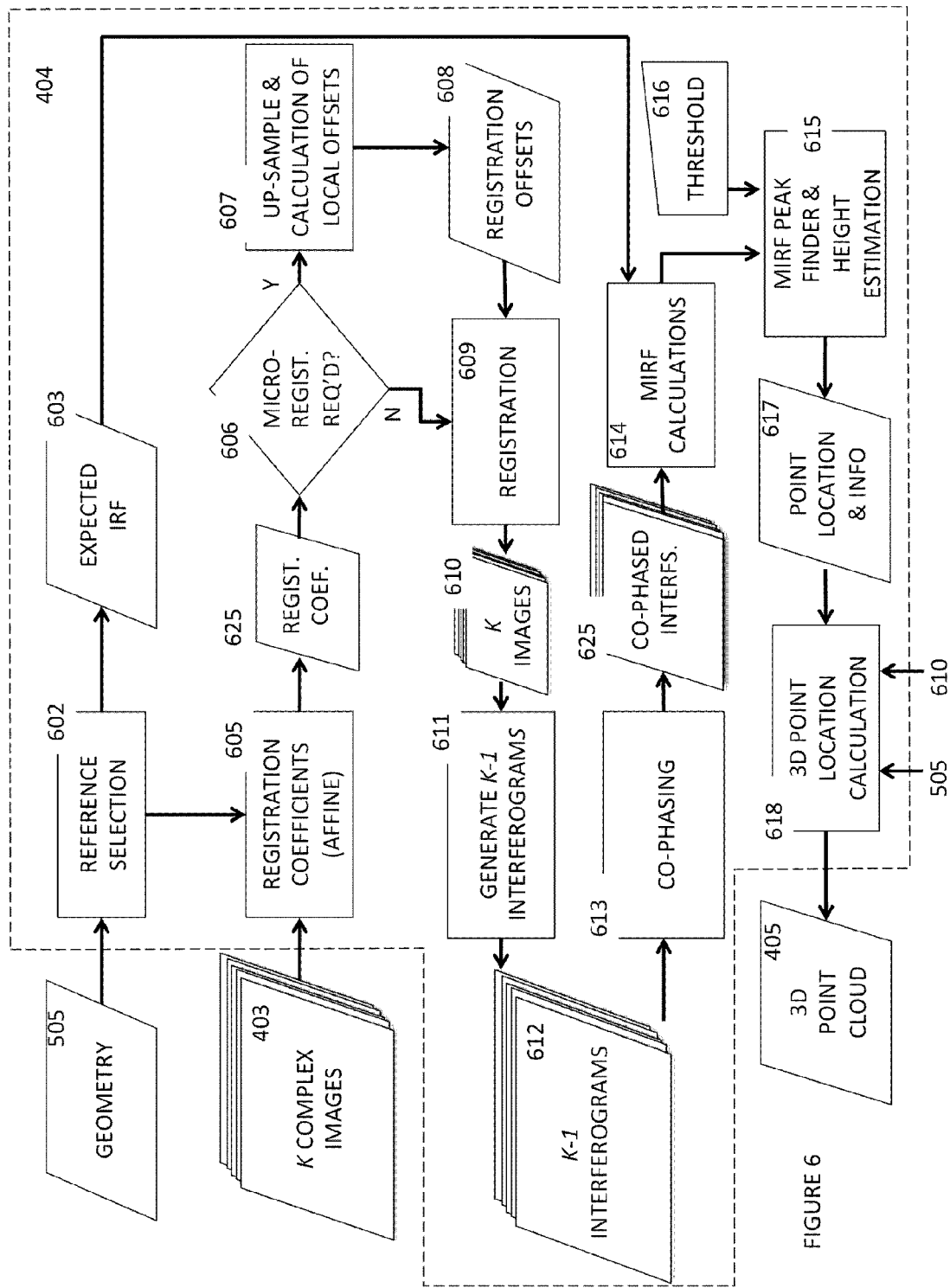
FIG. 6 is a flow diagram illustrating the process flow for generating the SPC results in the greatest detail.

The SAR Point Cloud processing is further described in more detail in FIG. 6. The K complex images 403 and the associated K geometry files 505 serve as input to the SAR Point Cloud processing system as discussed in FIG. 5. A selection of a reference SAR image is carried out 602 by considering the temporal and physical separations of the sparse aperture elements. While to some extent any of the K acquisitions may be used as a reference, we implement a process that attempts to minimize decorrelation of the interferograms by selecting the acquisition that simultaneously minimizes the squares of the temporal separations and physical separations, or equivalently the delta graze angles, associated with the interferograms formed using that reference. It is possible however, that any particular acquisition may not be optimal for a choice as reference as other conditions, particularly environmental conditions such as rain, may result in low interferometric coherence for a give reference. Selection of a suitable reference for repeat-pass data generally requires verification by examining the resulting interferometric coherence as well as examination of phase variations that may be produced by excessive atmospheric variations in the reference scene selected.

Once a reference is selected a theoretical, or expected, IRF 603 is calculated based on equation 14 using the known SAR geometry. This is stored for use later in the process.

Using the selected reference 602, each of the remaining K-1 secondary acquisitions are used calculate 2D registration offset 605 between each pair of data. These offsets are used to then generate a set of coefficients defining a linear 2D affine transformation 625 between the reference and each secondary. The linear affine transformation is such that a mapping between reference and each secondary is generated. This registration matches most of the corresponding coherent points between the elements of each pair. These coefficients are stored for later use in the process.

Depending on the geometry, scene height variation, and SAR resolution, it may be necessary to employ a higher order registration technique to account for differential layover between the reference and secondary images as indicated by decision 606. For non-parallel coherent SAR acquisitions, this additional step is almost always desirable due to the difference in layover direction between the images. However, for side-looking coherent geometry such as is a focus of the present invention, micro-registration is needed only due to range layover effects when the difference in the layover amount exceeds the expected accuracy of the micro-registration process. Typically, if the differential layover exceeds some fraction of the slant range resolution, micro-registration is required. For coherent SAR application, this fraction is typically known to those familiar with the art to be about 0.1. The differential layover (in slant range), $\Delta l$, associated with an elevated target at height h is given by $$\Delta l = h \frac{\Delta \psi}{\cos(\psi)},$$

(for small $\Delta \psi$). Therefore, for a given scene at a particular graze angle $\psi$, with in-scene height variations of $\Delta H$, micro-registration will be needed if the slant range resolution, $\rho_{sl}$, is less than $$10 \Delta H \frac{\Delta \psi}{\cos(\psi)}.$$

If it is determined in decision 606 that micro-reregistration is required, then a process of determining local registration offsets between the reference and secondary images is applied 607. Registration is carried out on an oversampled version of the complex imagery. The implemented up-sampling process is a standard zero-padded 2D complex Fourier transform process that results in output images that are 2× in pixels densities in each direction. This improves the micro-registration process 607. The micro-registration process accounts for the already determined linear affine coefficients, and represents higher order internal warping not captured by the affine transformation alone. The results are a dense grid of measured registration offsets 608 that are then filtered and stored for later use.

The registration process 609 considerers the linear affine transformation coefficients calculated by the affine registration step 605 and the local offsets 608 (if needed 606) to resample each of the secondary images (original sample spacing) such that they each globally register to the reference image. This registration is carried out using a SAR phase preserving interpolation process. The result is a stack of K complex images 610 that are mutually registered.

From the registered stack of complex images 610, K−1 interferograms 612 are generated 611. The interferograms are calculated on a pixel-by-pixel basis. No spatial averaging of phase or magnitude data, as is typically done in the art currently, is carried out. The interferogram is formed by multiplying each pixel in the reference image with the complex conjugate of the corresponding pixel in each of the secondary images. In addition, information in the geometry files 505 are used to "flatten" the phase of each of the interferograms by removing a calculated interferometric phase term that would result if the surface of the scene were along some known two- or three-dimensional surface, such as an ellipsoid representing a smooth earth surface. The success of the flattening process depends on the accuracy of the geometry data. Flattening establishes a zero reference height for subsequent interferometric and SPC height measurements. The K−1 flattened interferograms 612 are stored for subsequent processing.

The implementation we present here includes a step known as Co-phasing 613. This data-driven process is helpful to the present invention and allows each of the interferograms to have a spatially variant unknown phase between each of them to be estimated. This phase accounts for geometry errors from the geometry file 505 as well as low-order spatial phase errors that may be included in the data due to spatially variant atmospheric water vapor densities, and/or other unspecified sources of phase error.

The stack of co-phased interferograms 625 is used to measure the interferometric response function (MIRF) 614 for each pixel in the image. The MIRF is based on the IRF 603 function defined in equation 14:

$$MIRF(h) = \frac{1}{K-1}\left|1 + \sum_{k=1}^{K-1} \exp\{\varphi_{k,meas} - i\beta_k h\}\right|. \tag{15}$$

where $\phi_{k,meas}$ is the measured phase of the $k^{th}$ co-phased interferogram for the pixel under analysis, $\beta_k$ is the interferometric scale factor of the interferogram based on the known geometry 505. In this expression we have analytically included the contribution of the self-interferogram term, formed between the reference and itself, as a 1 outside the sum. For ideal data, the MIRF is a shifted version (in h) of the expected IRF with its peak at the true height of the scatterer in the pixel being examined. A sampled in height (h) MIRF vector is calculated using height steps based on the expected precision of the IRF 603, which is determined by the largest spaced elements of the sparse array. The range of the MIRF in height is determined by the expected height variation within the scene, or the height range of interest if that is known.

The value of the MIRF peak represents how well the measurements fit our model as shown in equation 14. For high SNR data with a single dominant scatterer within the pixel, the value should be close to 1.0. For lower SNR, and pixels that contain multiple scatterers at the same height, this value will be reduced, typically between 0.7 and 0.9. For pixels of very poor SNR and pixels with multiple scatterers at very different heights (due to layover), the peak value will be less than 0.5.

Once the MIRF is calculated 614, the peak of the MIRF is estimated 615. This is carried out by examining the MIRF values and retaining the peak value and each value on either side (in height) yielding three points that are closest to the true MIRF peak. A quadratic fit based on these three points is used to determine a more accurate estimate of the peak value and height. The value of the MIRF peak is compared to a threshold value derived from an established and fixed threshold 616. The derived threshold value takes into consideration the pixel's signal strength such that high thresholds are applied to lower SNR pixels. The range and azimuth coordinates of the pixels that exceed the derived threshold value are stored in a file 617 along with their MIRF value, averaged (across K) SAR backscatter value and height; while pixels that do not pass the derived threshold value are discarded from further analysis. This removes the noisiest points as well as points that have multiple scatterers at different heights within them (layover). The peak value indicates the reliability of the height measurement.

Using the known geometry 505 and interferometric reference elevation surface 610 used during interferogram generation 611, the three dimensional location of each point in the point location file is determined 618 and stored in a 3D point cloud file 405. In addition to the location, the averaged backscatter and MIRF peak value are also stored. The example implementation used stores the backscatter information as an intensity value of an Intensity-Hue-Saturation (IHS) color representation where the hue (color) is determined by the pixel height. In this embodiment, this is stored as Red-Green-Blue (RGB) coordinates with the purpose of assisting visualization software when rendering the point cloud.

The nature of a radar image is highly dependent on the geometry of the acquisition. This is especially true for man-made targets (such as vehicles and buildings). A man-made structure can appear very different in images acquired from different aspect (azimuth) angles. Some scatterers will be occluded and not represented in some SAR geometries, while appearing very bright in other SAR images acquired from different azimuths. Scattering objects that are not occluded can still appear very different as a function of azimuth angle due to the highly variable radar cross-section of the objects verses viewing angle. For this reason, a more complete point cloud can be obtained by combining point clouds obtained from differing geometries. A process for doing this is illustrated in FIG. 7.

Figure 7:
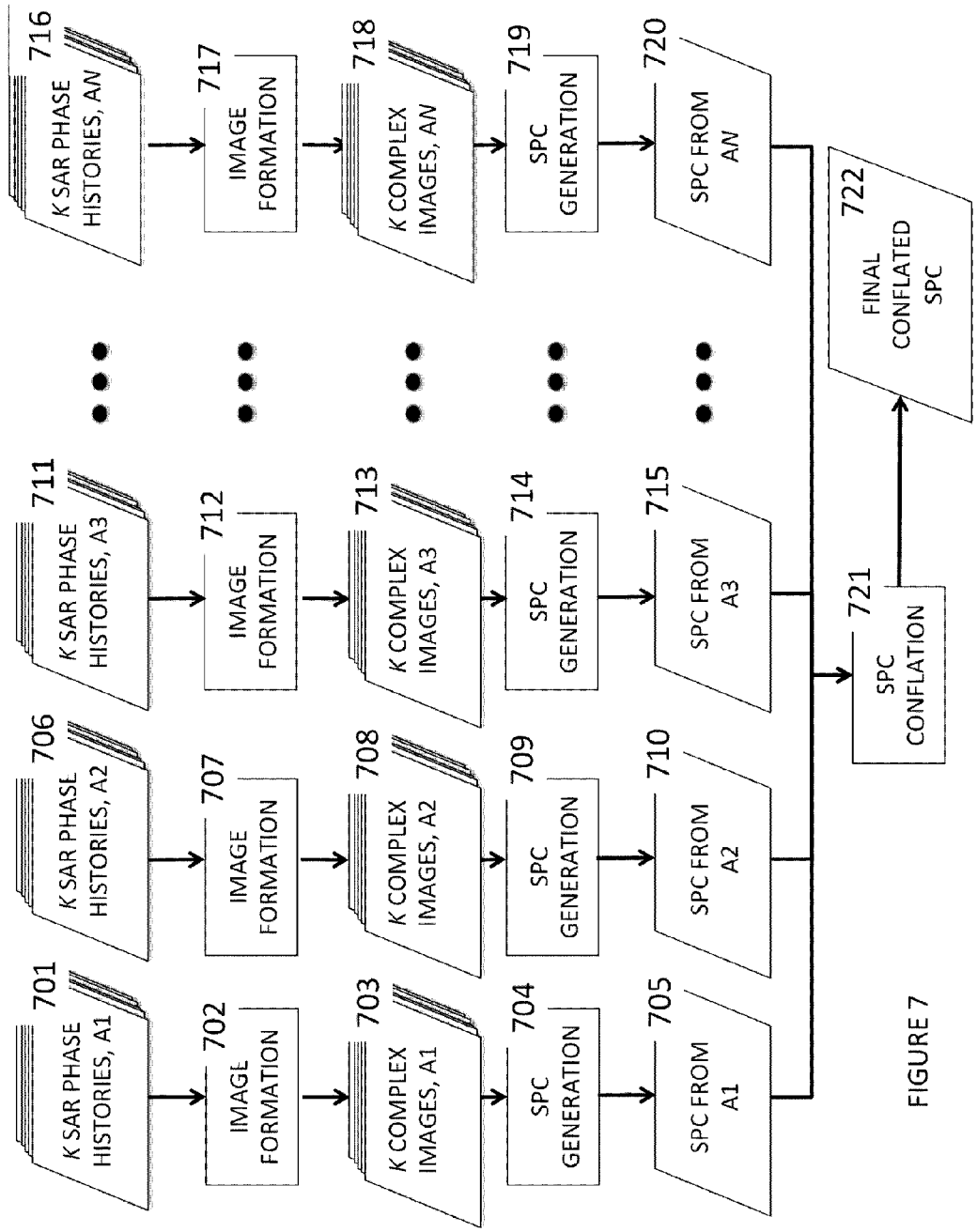
FIG. 7 is a flow diagram illustrating the process flow for using multiple point clouds generated from different azimuth viewing directions to generate a single multi-view SPC.

Referring to FIG. 7, several sets (N) of SAR data are processed in a manner similar to that shown in FIG. 4. Each set of acquisitions 701, 706, 711, 716 corresponds to a number (K) of coherent SAR images suitable as described above, for generating point clouds. (K may be different for each of the N data sets, however, we assume a single K herein without loss of generality.) Each of these K acquisitions within the N stacks are processed with an image formation process 702, 707, 712, 717 as described earlier, which generates N×K complex images 703, 708, 713, 718, stored in N stacks. These stacks are independently processed to SAR Point Clouds 705, 710, 715, 720 using the SPC generation system described above resulting in N SPCs 704, 709, 714, 719. Each of the N SAR Point Clouds from each azimuth is projected into the same coordinate system during processing. A conflation process 721 combines the N SAR point clouds to produce a single combine final conflated SAR Point Cloud 722.

Figure 8:
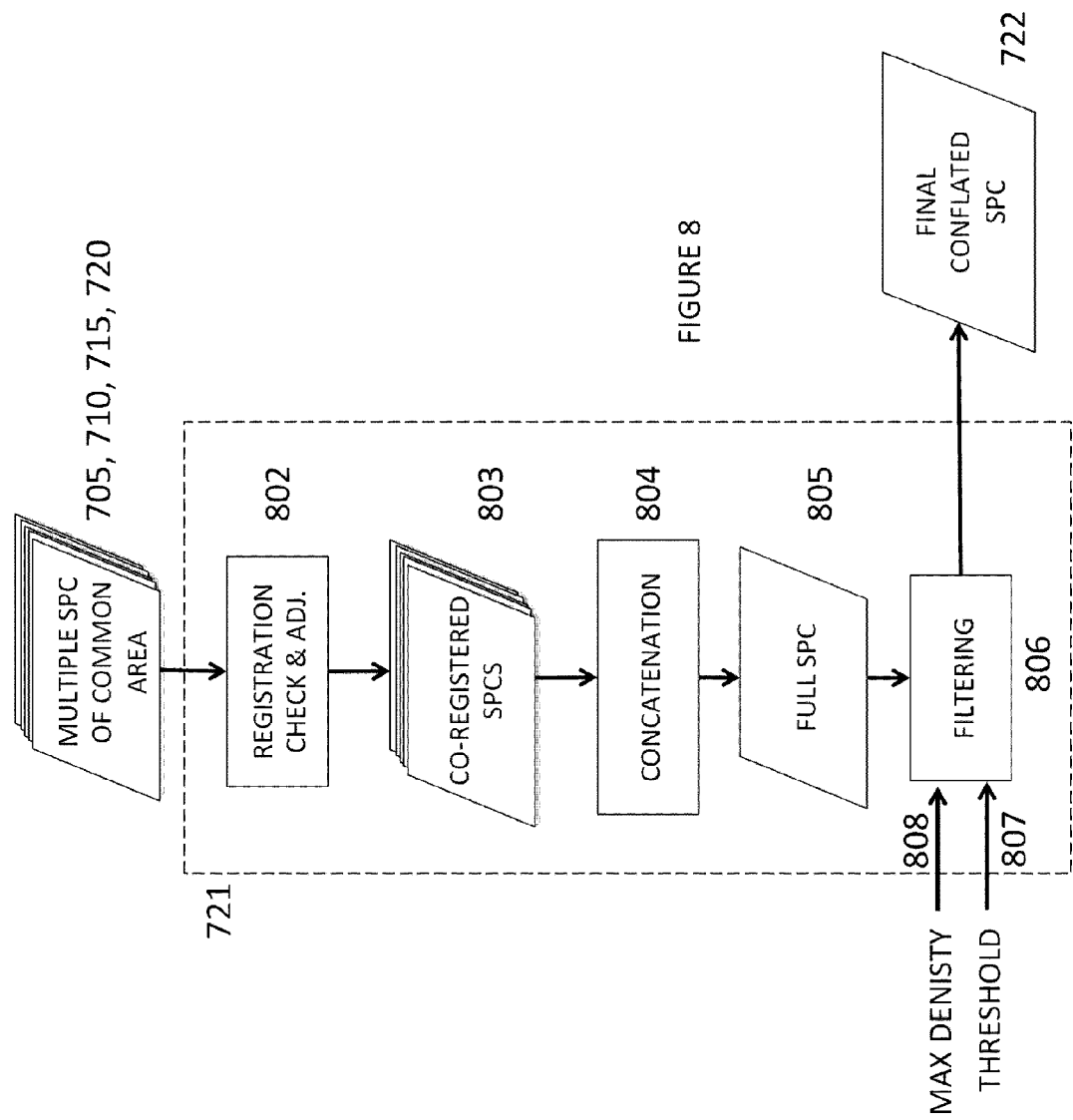
FIG. 8 is a flow diagram illustrating the conflation step of FIG. 7 in more detail.

The conflation process 721 in FIG. 8 begins by adjusting each of the SPCs 705, 710, 715, 720 so that small location errors and misregistrations between the individual SPCs are corrected 802. For systems with exquisite navigational information, this step is unnecessary. This registration check is carried out by statistical means. Each of the three SPC coordinates is independently statistically examined. Using a center portion of the points in one dimension, a mean value for that coordinate is calculated, weighted by each point's MIRF peak value (reliability). Using the center 90% of the points for this operation is a reasonable approach. This is carried out for each dimension (x, y, and z) for each SPC. The registration check is carried out by comparing the mean values of each dimension of each SPC to the corresponding mean values from the SPC that is closest to it in terms of collection geometry, as well to the ensemble of relative offsets measured. These offset values are used to shift each of the SPCs into better registration with each other 803, and may be represented by a simple image shift, or a more complicated 3D warping. This step is highly data dependent and depends on the number of independent SPCs used and their relative geometry. The standard deviations of the x, y and z distributions should also be examined to establish the significance of the measured mean values. This adjustment should be examined prior to application.

The co-registered SPC 803 are then concatenated in step 804 so that a single full SPC file 805 is formed containing all of the points from the original data files. This file is then filtered 806 by first applying a user-selected threshold 807 so that only points with MIRF peak values above this level are passed for further filtering. This represents a quality threshold. The interim thresholded SPC is then examined to assure a maximum point density is not exceeded by retaining only the highest MIRF peak value points within a 3-space volume as determined by the maximum density parameter 808.

The resulting SPC is the final conflated point cloud 722, and has the same format as the original SPCs that were provided as input to the conflation process.

Figure 9:
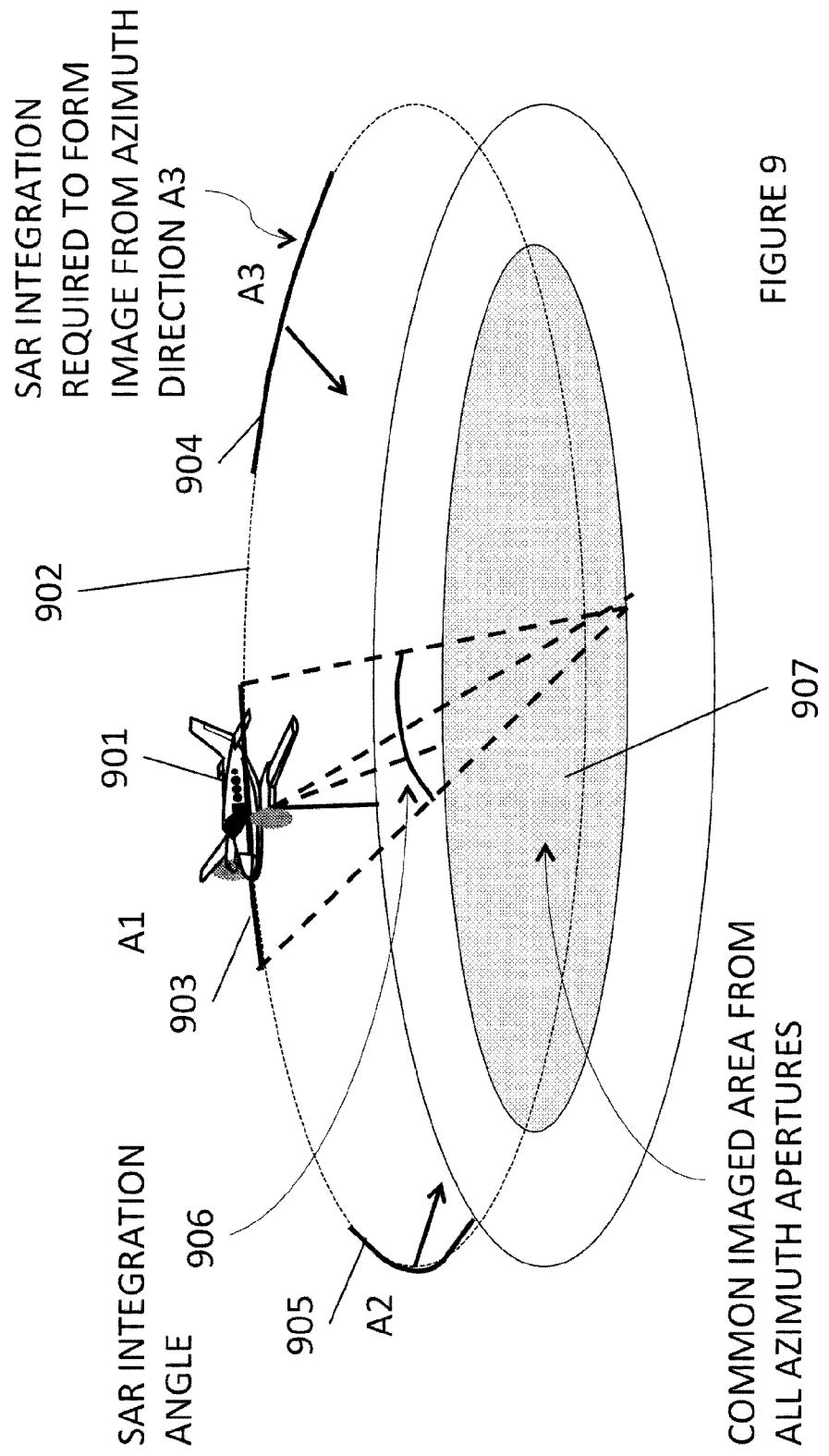
FIG. 9 is a schematic diagram illustrating a method for obtaining multi-view data such as that used in the embodiment of FIG. 8. The embodiment of FIG. 9 illustrates the use of an aircraft gathering data along a circular flight path.

A preferred method for the generation of complete point clouds from SAR is to utilize a SAR 901 flying in a circular geometry as illustrated in FIG. 9. Here the SAR 901 flies along a circular trajectory 902 about a target area of interest 907. The SAR generates a synthetic aperture A1 by operating along an arc of the circle 903 such that data form an azimuth aperture 906 appropriate for generating a SAR image of the AOI 907. As the SAR system completes its circle, many apertures may be formed from different azimuths such as A2 905 and A3 904. The circle collection geometry is repeated K times to form appropriate sparse apertures for SPC processing. The ideal implementation is to continuously collect data around the circles so that all azimuths are represented in the formed SPCs.

Figure 10:
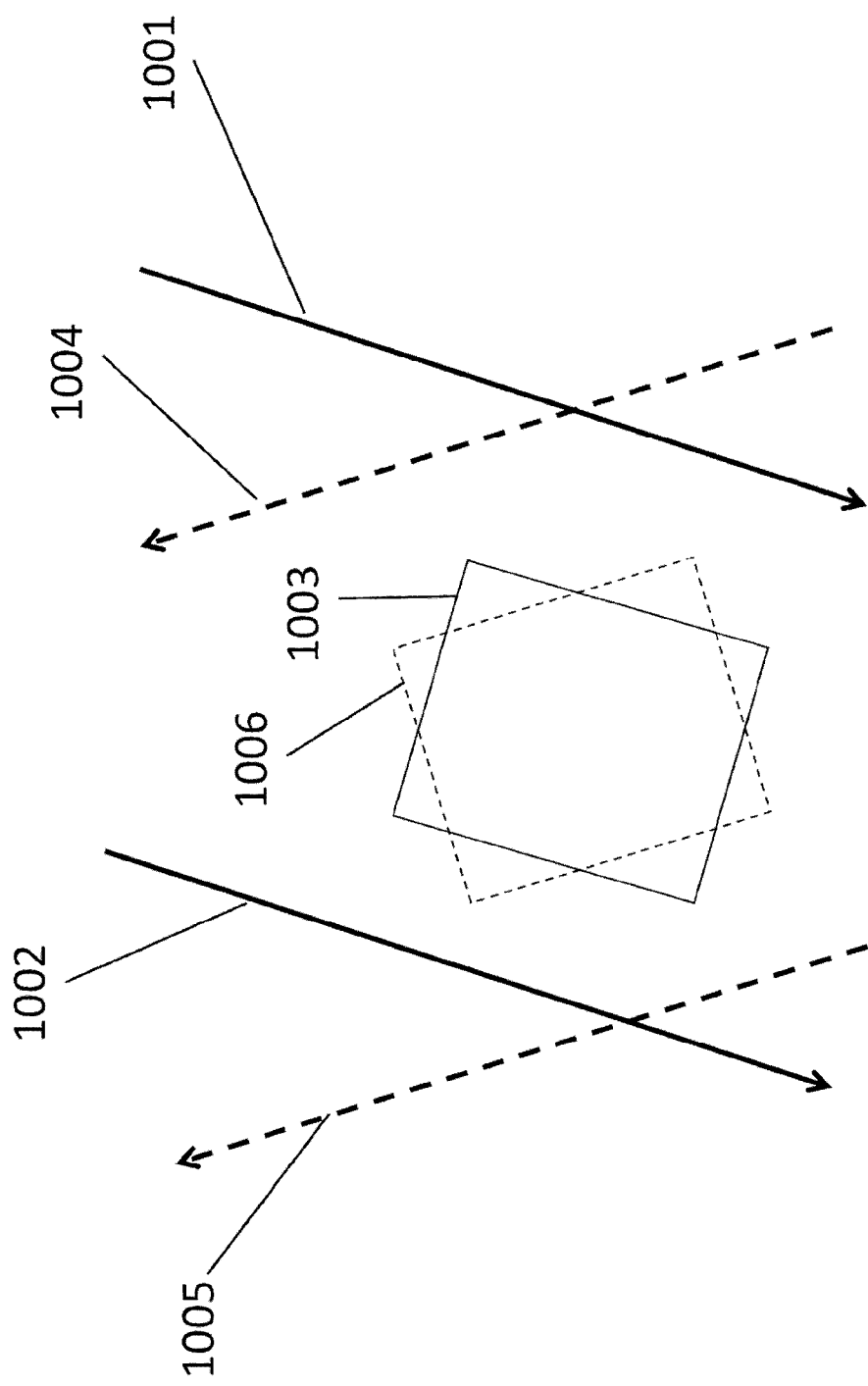
FIG. 10 is a schematic diagram illustrating a method for obtaining multi-view data such as that used in the embodiment of FIG. 8. The embodiment of FIG. 10 illustrates the use of an orbiting spacecraft with a SAR.

If the SAR system is located in space on an earth-orbiting spacecraft, obtaining a circular collection geometry as described above is not possible. However viewing the same location on the ground from four different orbital locations can generate an improved SPC product. As indicated in FIG. 10, by viewing a location 1003 during the descending passes 1001, 1002 of the orbital SAR using both the right-looking and left-looking broadside directions, two independent point clouds can be generated, using repeat collections for each. Similarly an overlapping region 1006 may be obtained by using both left 1004 and right-viewing 1005 geometries using repeated ascending orbital passes. If the SAR system has any significant azimuth squint capabilities, further SPC generations from other azimuths would be possible, thus augmenting and improving the conflated SPC.

Figure 11:
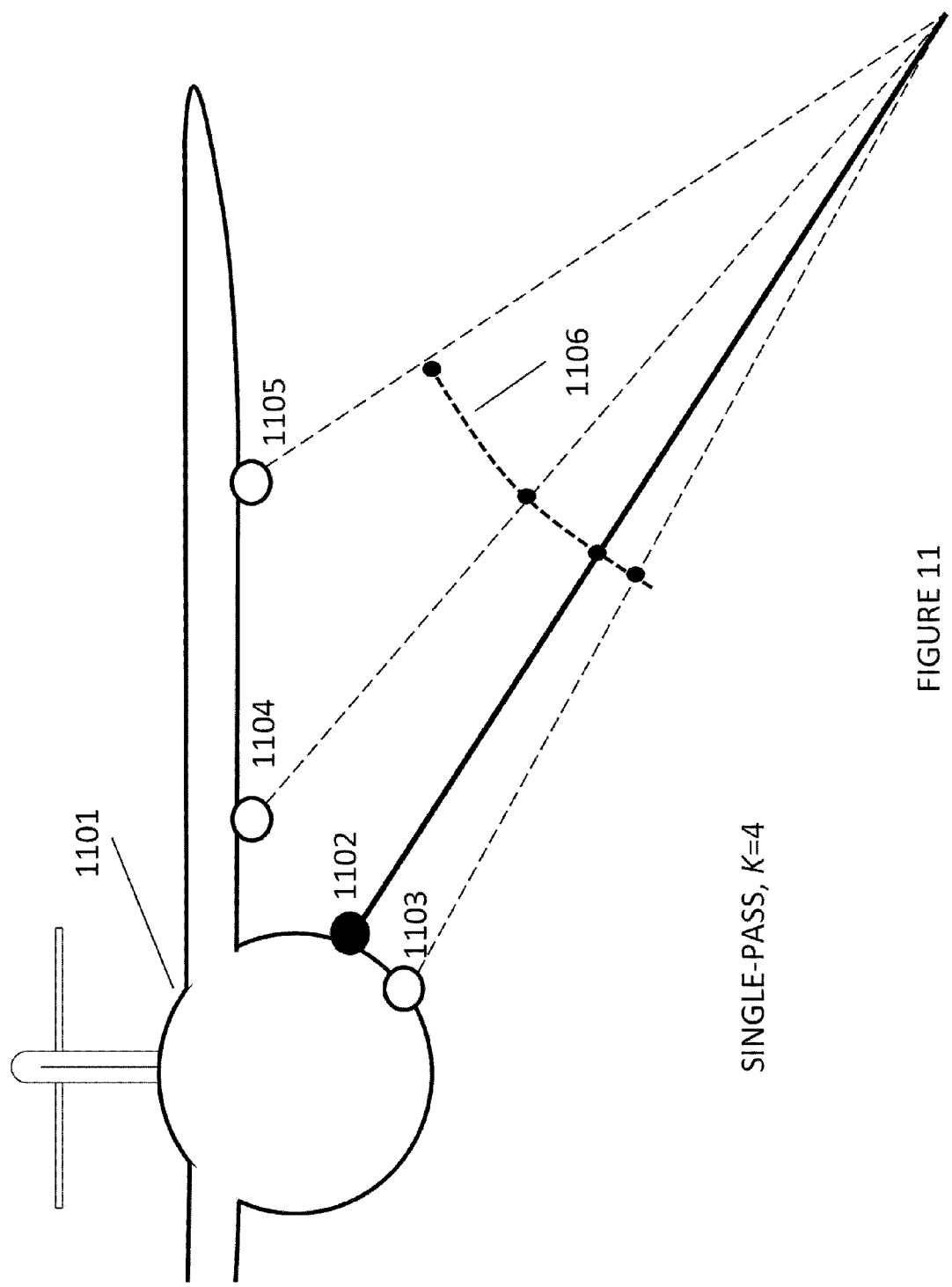
FIG. 11 is a schematic diagram illustrating a single-pass SPC data acquisition using a single active SAR system on an aircraft with several passive receive-only systems spaced along an aircraft structure.

A preferred embodiment of a SAR Point Cloud generation system includes a SAR collection system that can generate the needed K sparse element phase centers with a single pass. Such a system FIG. 11 has K aperture elements 1102, 1103, 1104, 1105 located on a single platform 1101. An advantage of such an embodiment is that all of the sparse aperture data is collected at the same time, minimizing the influence of temporal decorrelation due to changes within the scene between observations. A further advantage of such a system is that the spacing between the elements can be designed and built such that a specific sparse aperture 1106 with a known IRF is achieved. Furthermore, the design may be simplified through the use of a single active SAR system 1102. The remaining K−1 sparse elements 1103, 1104, and 1105 are receive-only systems that are less expensive and easier to implement than the active SAR system. Such an implementation can be made more sensitive to height by using higher frequency radar systems since for a given sparse aperture size, dictated by the space available on the platform, higher precision is achieved for shorter wavelengths.

What is claimed is:

1. A signal processing method used with multi-aperture synthetic aperture radar data forming a sparse aperture comprising the steps of:
   a. collecting multiple aperture raw SAR phase history data with each collection representing an element of a sparse aperture;
   b. processing the raw phase history data and forming complex imagery based on the raw phase history data;
   c. generating x,y,z positions for individual points within the complex imagery and directly generating 3D point cloud data from the x,y,z positions;
   d. repeating steps (a)-(c) for multiple geometries to generate multiple 3D point cloud data sets of overlapping areas; and
   e. combining the multiple 3D point cloud data sets.

2. The method of claim 1 wherein the collecting step 1a includes the step of spacing the SAR sparse aperture elements in a pseudo random manner to minimize the deleterious effects of height ambiguities.

3. The method of claim 1 wherein step 1a includes the step of performing near-repeat flight tracks of a SAR system acquired over time.

4. The method of claim 1 wherein step 1a includes the step of using a single platform with multiple SAR elements on board.

5. The method of claim 4 wherein fewer than all of the SAR elements are actively transmitting radar pulses.

6. The method of claim 4 where the spacing of the SAR elements is configured to reduce height ambiguities over a height range of interest to a selected level for a given number of SAR elements.

7. The method of claim 1 wherein the processing step 1b includes the step of using a well-defined ground reference plane such that output pixels are in a known radar coordinate system.

8. The method of claim 7 further including the step of using information available in geometry files associated with the complex images to define the coordinate system.

9. The method of claim 1 wherein the generating step 1c also utilizes geometry information from at least one of the following sources to generate 3D point cloud data:
   SAR platform navigational data files;
   a data driven technique; or
   a manually derived process.

10. The method of claim 9 wherein step 1c comprises the steps of:
   a. selecting reference imagery;
   b. calculating the expected 3D response (IRF);

c. registering the SAR imagery from each of the collections including the steps of—
   i. determining a linear affine transformation between the reference image and all secondary images,
   ii. determining if higher-order registration is necessary,
   iii. optionally generating higher-order registration coefficients according to step 10cii, and
   iv. applying registration coefficients to obtain co-registered complex imagery;
d. forming multiple co-registered coherent interferograms using co-registered complex imagery;
e. co-phasing each of the interferograms;
f. performing MIRF calculations;
g. detecting and thresholding the peak of the MIRF for each pixel in the interferogram stack; and
h. generating a three-dimensional point for each point that passes the threshold of step 10g, including the steps of—
   i. locating three-dimensionally the location of the point,
   ii. displaying red-green-blue information that encodes radar backscatter information and height, and
   iii. determining a MIRF peak value containing information regarding the point precision, and
   iv. transforming the location of the three-dimensional point generated in 9h into a standard map projection coordinate system.

11. The method of claim 1 wherein step 1d includes the steps of determining offsets between each of the point cloud data sets and correcting those offsets.

12. The method of claim 11 further including the step of filtering the point cloud data sets based on point quality and density.

13. The method of claim 1 wherein step 1d is performed including the step of navigating a SAR system along a generally circular flight path.

14. The method of claim 13 wherein the step of navigating is performed using a single active SAR and the circular path is flown multiple times.

15. The method of claim 13 wherein the step of navigating is performed using a single platform with multiple SAR systems on board, and wherein the generally circular flight path is flown once.

16. The method of claim 1 wherein step 1d includes the steps of:
a. forming geometrically diverse sparse apertures using a spaceborne SAR system; and
b. viewing with the spaceborne SAR system a common ground area of interest from multiple directions that includes at least one of the following:
   squinting SAR instruments;
   ascending and descending orbits; or
   left and right looking SAR instruments onboard the orbiting platform.

17. A signal processing method used with multi-aperture synthetic aperture radar data forming a sparse aperture comprising the steps of:
a. providing complex imagery representing processed collections of multi-aperture SAR phase history data with each collection representing an element of a sparse aperture;
b. generating x,y,z positions for individual points within the complex imagery and directly generating 3D point cloud data from the individual points;
c. repeating steps (a) and (b) for multiple geometries to generate multiple 3D point cloud data sets of overlapping areas; and
d. combining the multiple 3D point cloud data sets.

18. The method of claim 17 wherein step 17a includes the steps of collecting multiple aperture raw SAR phase history data with each collection representing an element of a sparse aperture, processing the raw phase history data, and forming complex imagery.

19. The method of claim 17 wherein the generating step 17b also utilizes geometry information from at least one of the following sources to generate 3D point cloud data:
   SAR platform navigational data files;
   a data driven technique; or
   a manually derived process.

20. The method of claim 17 wherein step 17c includes the steps of determining offsets between each of the point cloud data sets and correcting those offsets.

21. The method of claim 20 further including the step of filtering the point cloud data sets based on point quality and density.

22. Apparatus for mapping terrain and structures found on the terrain in three dimensions comprising:
   an input connection configured to input multiple sets of complex imagery representing processed collections of multi-aperture SAR phase history data with each collection representing an element of a sparse aperture, the multiple sets comprising complex imagery for multiple geometries covering overlapping area, the complex imagery including x,y,z positions for individual points;
   a processing system configured to generate 3D point cloud data sets directly from the x,y,z positions within the multiple sets of complex imagery; and
   the processing system further configured to combine the multiple 3D point cloud data sets.

23. The apparatus of claim 22 wherein the processing system is further configured to utilize geometry information from at least one of the following sources to generate 3D point cloud data:
   SAR platform navigational data files;
   a data driven technique; or
   a manually derived process.

24. The apparatus of claim 22 wherein the processing system is further configured to determine offsets between each of the point cloud data sets and correct those offsets.

25. The method of claim 24 wherein the processing system is further configured to filter the point cloud data sets based on point quality and density.

* * * * *